United States Patent
Shitrit-Efergan et al.

(10) Patent No.: US 12,238,125 B2
(45) Date of Patent: *Feb. 25, 2025

(54) DETECTION AND MITIGATION OF RECURSIVE DOMAIN NAME SYSTEM ATTACKS

(71) Applicant: RADWARE, LTD., Tel Aviv (IL)

(72) Inventors: Sharon Shitrit-Efergan, Beer-Sheva (IL); Eyal Rundstein, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,968

(22) Filed: Apr. 13, 2020

(65) Prior Publication Data

US 2020/0244689 A1    Jul. 30, 2020

Related U.S. Application Data

(63) Continuation of application No. 15/611,051, filed on Jun. 1, 2017, now Pat. No. 10,623,425.

(51) Int. Cl.
*H04L 29/06* (2006.01)
*H04L 9/40* (2022.01)
*H04L 61/4511* (2022.01)

(52) U.S. Cl.
CPC ...... *H04L 63/1425* (2013.01); *H04L 63/1458* (2013.01); *H04L 61/4511* (2022.05)

(58) Field of Classification Search
CPC ............. H04L 63/1425; H04L 63/1458; H04L 61/1511; H04L 63/1416; H04L 63/1408; H04L 2463/141; H04L 2463/142
See application file for complete search history.

(56) References Cited

U.S. PATENT DOCUMENTS

| | | | |
|---|---|---|---|
| 7,836,496 B2 | 11/2010 | Chesla et al. | |
| 7,930,428 B2 | 4/2011 | Drako | |
| 8,484,377 B1 | 7/2013 | Chen et al. | |
| 9,026,676 B1 | 5/2015 | Chen et al. | |
| 9,172,713 B2 | 10/2015 | Joffe et al. | |
| 9,294,490 B1* | 3/2016 | Cook | H04L 63/1458 |
| 9,621,582 B1 | 4/2017 | Hirsh | |
| 9,832,141 B1* | 11/2017 | Raftery | G06F 16/90335 |
| 9,886,445 B1 | 2/2018 | Gupta et al. | |

(Continued)

OTHER PUBLICATIONS https://www.cisa.gov/sites/default/files/publications/DNS-recursion033006.pdf last visited Apr. 2, 2024.*

(Continued)

*Primary Examiner* — Richard A McCoy
(74) *Attorney, Agent, or Firm* — M&B IP Analysts, LLC

(57) ABSTRACT

A method and system for detecting domain name system (DNS) recursive cyber-attacks are presented. The system includes learning a plurality of baselines of at least rates and rate invariants of DNS features; monitoring DNS traffic directed to and from a DNS resolver, wherein the DNS resolver is communicatively connected between at least one client and at least one name server; analyzing the monitored DNS traffic using at least one detection function to detect an anomaly based in part on at least one baseline of the plurality of learnt baselines; and upon detection of at least one anomaly, performing at least one mitigation action to filter out incoming DNS queries to a domain name under attack.

16 Claims, 7 Drawing Sheets

(56) References Cited

U.S. PATENT DOCUMENTS

| | | | |
|---|---|---|---|
| 10,911,483 B1* | 2/2021 | Wasiq | H04L 63/10 |
| 2006/0146816 A1* | 7/2006 | Jain | H04L 63/1408 |
| | | | 370/389 |
| 2008/0028073 A1 | 1/2008 | Trabe et al. | |
| 2012/0022942 A1 | 1/2012 | Holloway et al. | |
| 2012/0297478 A1* | 11/2012 | Martin | H04L 63/1483 |
| | | | 726/22 |
| 2014/0245436 A1 | 8/2014 | Dagon et al. | |
| 2015/0180892 A1 | 6/2015 | Balderas | |
| 2016/0044017 A1 | 2/2016 | Joffe et al. | |
| 2016/0057166 A1* | 2/2016 | Chesla | H04L 63/14 |
| | | | 726/23 |
| 2016/0065611 A1 | 3/2016 | Fakeri-Tabrizi et al. | |
| 2016/0099852 A1* | 4/2016 | Cook | H04L 47/2425 |
| | | | 709/224 |
| 2016/0150004 A1 | 5/2016 | Hentunen | |
| 2016/0234249 A1 | 8/2016 | Wong | |
| 2016/0330226 A1* | 11/2016 | Chen | H04L 29/06877 |
| 2016/0380960 A1* | 12/2016 | Pandrangi | H04L 67/2814 |
| | | | 709/224 |
| 2017/0041332 A1* | 2/2017 | Mahjoub | H04L 43/0876 |
| 2017/0295196 A1* | 10/2017 | Arnell | H04L 63/1425 |
| 2017/0318035 A1* | 11/2017 | Baughman | G06N 3/08 |
| 2018/0027416 A1* | 1/2018 | Bickford | H04L 63/1425 |
| | | | 726/23 |
| 2018/0115582 A1* | 4/2018 | Thakar | H04L 63/1466 |
| 2018/0176241 A1* | 6/2018 | Manadhata | H04L 63/1425 |
| 2018/0219912 A1* | 8/2018 | Maslak | H04L 63/1458 |
| 2018/0248906 A1* | 8/2018 | Scherman | H04L 63/0245 |
| 2018/0262467 A1* | 9/2018 | Jayawardena | H04L 63/0254 |

OTHER PUBLICATIONS https://www.techtarget.com/searchsecurity/definition/DNS-attack last visited Apr. 2, 2024.*

* cited by examiner

DETECTION AND MITIGATION OF RECURSIVE DOMAIN NAME SYSTEM ATTACKS

This application is a continuation application of U.S. patent application Ser. No. 15/611,051 due Jun. 1, 2017, the contents of which are incorporated by reference.

TECHNICAL FIELD

This disclosure generally relates to implementation of security techniques for detecting and mitigating DNS recursive attacks.

BACKGROUND

A significant problem facing the Internet community is that online businesses and organizations are vulnerable to malicious attacks. Cyber-attacks have been executed using a wide arsenal of attack techniques and tools targeting both information maintained by online businesses and their IT infrastructures. Cyber-attacks typically aim to steal data, disable applications or services, or damage online assets of organizations. For example, a domain name system (DNS)-based distributed denial-of-service (DDoS) attack is an example of an attack that can damage the network infrastructure and disable applications, services, and websites.

One method of executing DNS-based DDoS attacks is by exploiting recursive DNS resolvers to send a query flood to authoritative DNS servers. Such attacks are collectively referred to as a recursive random subdomains attack. Execution of such an attack is described herein with respect to FIG. 1. A recursive random subdomain attack can also target the recursive resolver itself by consuming CPU resources and denying service from legitimate customers.

A recursive DNS resolver 110 is deployed between a client device 120 and a plurality of authoritative DNS name servers 130-1 through 130-n. The client device 120 sends a recursive query to the DNS resolver 110 including a query name. The DNS resolver 110 returns an IP address corresponding to the query name. A query name typically includes one or more labels delimited by periods that are translated from right ("top level domain") to left ("sub domain"). For example, in a fully qualified domain name (FQDN) of "www.example.com.", the root level is represented by the '.', top level domain is ".com", the domain is "example.com", and the sub domain is "www".

An authoritative DNS name server 130 answers only the queries for the zone (a domain name space) that it is responsible for, in order to quickly respond to resolver queries. An authoritative name server 130 does not respond to recursive queries and does not cache query results.

To resolve a FQDN, the DNS recursive server (also referred to as a DNS recursive resolver) 110 first checks if an IP address for the domain name is saved in its cache. If so, the IP address is returned in a query response. If the query cannot be resolved based on the cached information, the DNS recursive resolver 110 queries a root DNS server (e.g., the name server 130-1).

If the root name server 130-1 is authoritative for the top-level domain (e.g., ".com"), the server 130-1 refers the resolver to the next authoritative DNS name server for the domain (e.g., "example.com"). The name server (e.g., the name server 130-2) delegated by the root name server 130-1 refers the query to yet another DNS server (e.g., the name server 130-n) that is authoritative for the next sub domain level (e.g., "s1.example.com"). This trail of referrals continues until the FQDN is resolved. Thus, queries are often forwarded to multiple authoritative DNS name servers 130. The recursive resolver continues until the name server in charge of the domain (e.g., "www.s1.example.com") returns the IP address to the recursive resolver, which forwards it to the original requester.

The full domain name can also be resolved by querying only one authoritative DNS server, as the DNS recursive resolver 110 has knowledge about such a name server. A domain name fully resolved by one of the name servers 130-1 through 130-n is cached at the DNS resolver 110 and returned as a query response to the client 120.

If the root name server 130-1 is not authoritative for that particular top-level domain name, the root name server 130-1 refers the query to other authoritative DNS name servers 130 that may be able to resolve the query.

DNS queries and responses are transmitted using the user datagram protocol (UDP) and, thus, such transmissions are vulnerable to various forms of malicious activity. A recursive DNS attack targets the recursive DNS resolver 110 to achieve denial of service for legitimate users using the same resolution service. To this end, during a recursive DNS attack, the attacker generates multiple DNS queries using forged and random full or sub domain names. The recursive DNS resolver 110 triggers the resolution process discussed above to resolve these queries, as most likely the responses are not cached. Handling a magnitude of recursive DNS queries overloads the operation of the DNS resolver 110. Furthermore, a crafted recursive random subdomain attack can also flood a specific target domain.

Existing cyber-security solutions are not effective or efficient in detecting recursive DNS attacks. Typically, such solutions are designed to block recursive DNS queries using a black list. A black list includes domain names known to be invalid or forged domain names. However, a black list is not comprehensive, and a malicious query to resolve a domain name not designated in the list may be processed by the DNS resolver 110. Thus, black lists can be easily exploited by attackers to execute a recursive DNS attack.

Another existing technique for detecting DNS-based DDoS attacks is identifying deviations from a normal rate of incoming requests to the DNS resolver 110. Such a technique may be efficient for detecting flood type behavior (a high number of resolver queries in a short time interval), but is not efficient for detecting recursive DNS attacks, which are not characterized by flood behavior.

In most cases, a recursive random subdomain attack requires manual intervention under attack in order to accurately distinguish between attack "bad" queries and legitimate "good" queries. There are stateless flood-proof methods that can automatically and accurately filter only "good" queries in a random subdomain DNS attack.

Therefore, it would be advantageous to provide an efficient solution that would cure the deficiencies of existing security solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for detecting domain name system (DNS) recursive cyber-attacks. The method comprises learning a plurality of baselines of at least rates and rate invariants of DNS features; monitoring DNS traffic directed to and from a DNS resolver, wherein the DNS resolver is communicatively connected between at least one client and at least one name server; analyzing the monitored DNS traffic using at least one detection function to detect an anomaly based in part on at least one baseline of the plurality of learnt baselines; and upon detection of at least one anomaly, performing at least one mitigation action to filter out incoming DNS queries to a domain name under attack.

Some embodiments disclosed herein also include a system for detecting domain name system (DNS) recursive cyber-attacks. The system comprises a processing circuitry; and a memory, the memory containing instructions that, when executed by the processing circuitry, configure the system to: learn a plurality of baselines of at least rates and rate invariants of DNS features; monitor DNS traffic directed to and from a DNS resolver, wherein the DNS resolver is communicatively connected between at least one client and at least one name server; analyze the monitored DNS traffic using at least one detection function to detect an anomaly based in part on at least one baseline of the plurality of learnt baselines; and upon detection of at least one anomaly, perform at least one mitigation action to filter out incoming DNS queries to a domain name under attack.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1:
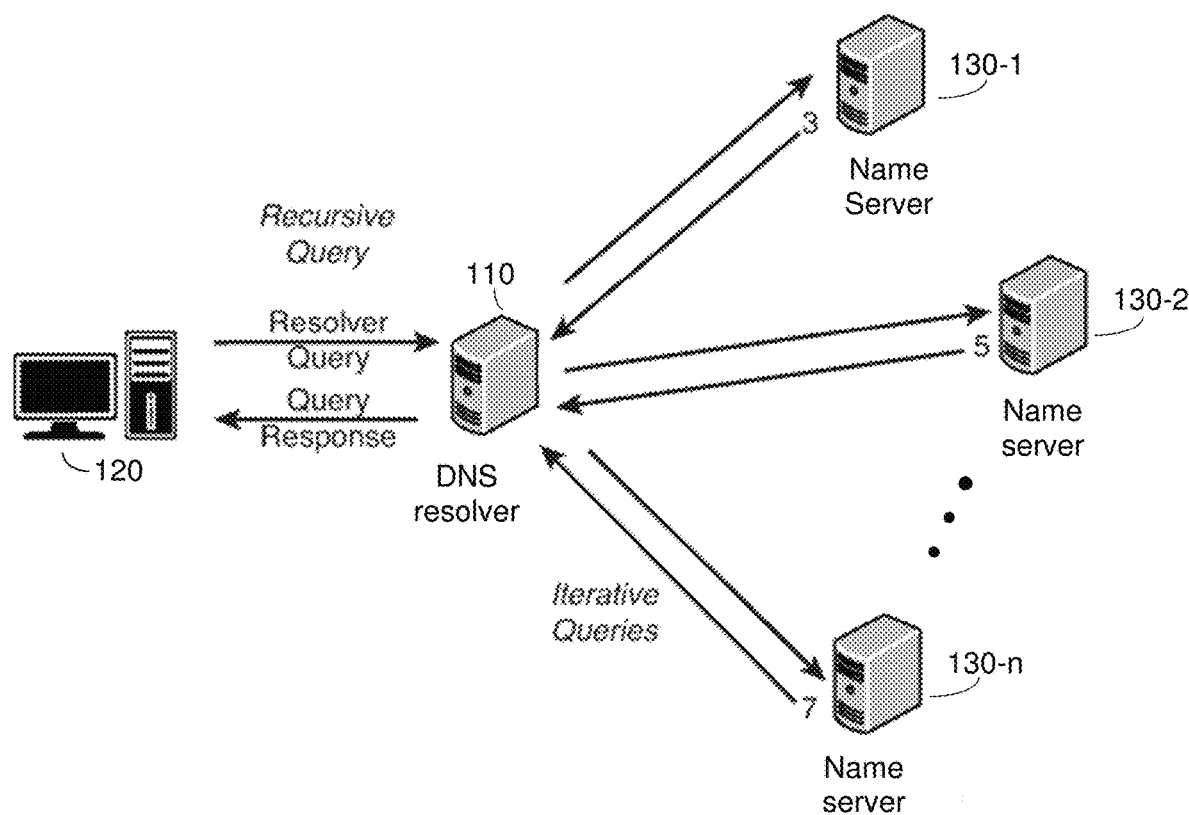
FIG. 1 is a diagram illustrating the operation of a DNS recursive attack.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
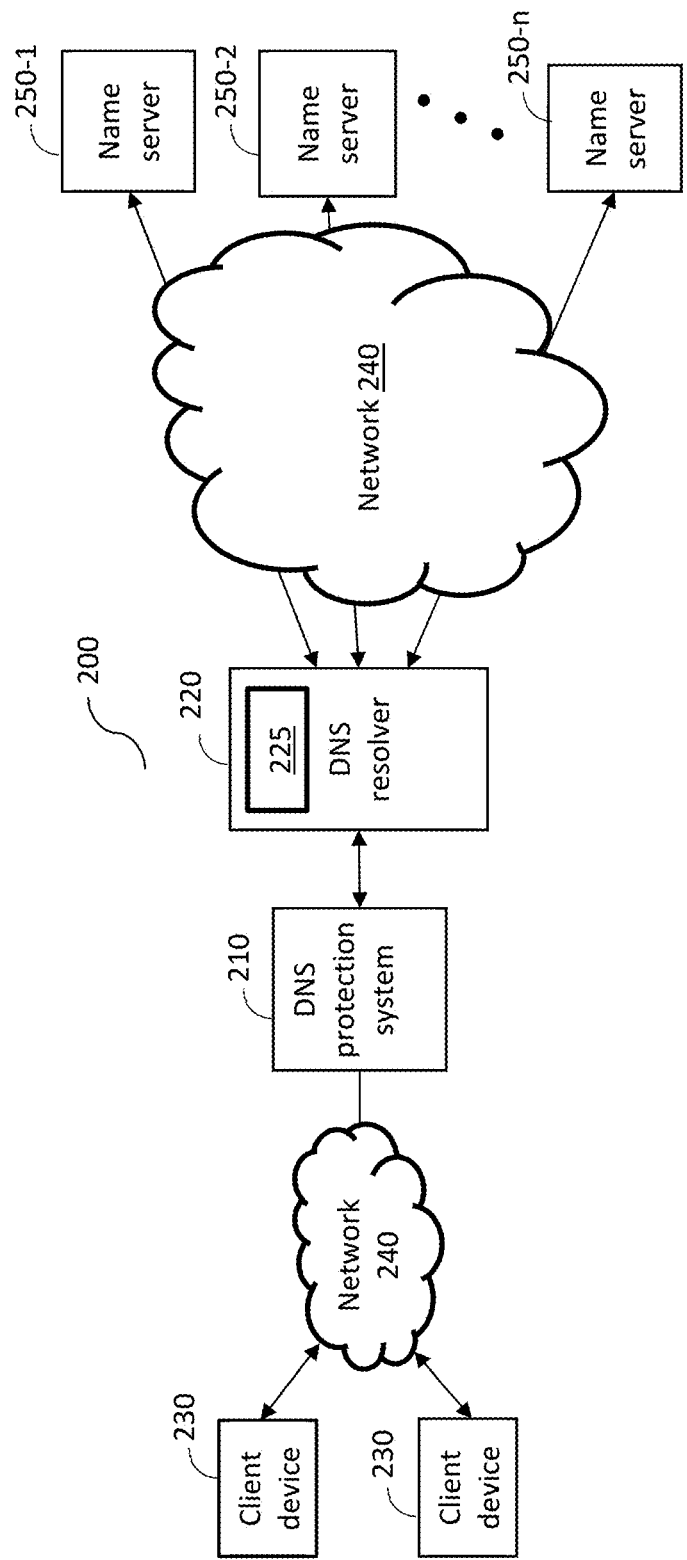
FIG. 2 illustrates a network diagram utilized to describe the various embodiments.

FIG. 2 shows an example network diagram 200 utilized to describe the various disclosed embodiments. As illustrated in FIG. 2, a domain name system (DNS) protection system 210 is deployed between a DNS resolver 220 and client devices 230-1 and 230-2 (collectively referred to client devices 230, merely for simplicity purposes) via, for example, a network 240. The DNS resolver 220 is further communicatively connected to a plurality of authoritative DNS name servers 250-1 through 250-n (hereinafter referred to individually as a "name server" 250 and collectively as "name servers" 250, merely for simplicity purposes).

The client devices 230 may be devices providing legitimate DNS queries to resolve true domain names (e.g., www.google.com) or attacker devices (e.g., bots) that generate malicious DNS queries containing random and forged domain names. That is, attacker devices attempt to execute recursive DNS attacks. The network 240 may be, but is not limited to, a local area network (LAN), a wide area network (WAN), the Internet, similar networks, and any combination thereof. The DNS resolver 220 and name servers 250 can also be facilitated over a network, such as the network 240.

As noted above, the DNS resolver 220 returns an IP address corresponding to a domain name in response to a DNS query (request) received from one of the client devices 230. A name server (e.g., the name server 250-1) answers only the queries for the zones (an IP address range) that it is responsible for, to quickly respond to resolver queries. A name server 250 does not respond to recursive queries and does not cache query results.

To resolve the FQDN, the DNS resolver 220 checks if an IP address for the domain name is saved in a cache (225) of the DNS resolver 220. If so, the IP address is returned in a query response. If the query cannot be resolved based on the cached information, the DNS resolver 220 queries a root name server (e.g., the name server 250-1). If the root name server 250-1 is authoritative for the top-level domain, it returns an IP address of a name server (e.g., the name server 250-2) that is capable of resolving the sub domain. However, if the root name server 250-1 is not authoritative for that top-level domain name, a recursive process begins by querying the name servers 250 until the domain name is fully resolved. A fully resolved domain name is cached at the DNS resolver 220 and returned as a query response to the client device 230 that sent the DNS query.

According to the disclosed embodiments, to provide a defense against recursive DNS attacks, the DNS protection system 210 is configured to perform detection and mitigation techniques. Specifically, in the detection mode, the DNS protection system 210 is configured to identify deviations from a normal behavior of the DNS resolver 220, of the name servers 250, or of both. The normal behavior is determined with respect to a peace time, i.e., a time when no attacks are detected or performed. To this end, a plurality of detection engines (shown in FIG. 3) are tuned to monitor and track DNS traffic statistics from DNS messages. The DNS messages include queries (requests) issued by any of the client devices 230, queries and responses issued by the DNS resolver 220, and responses sent by the name servers 250. The system 210 is configured to utilize the DNS traffic characteristics to derive rate and rate-invariant metrics.

Figure 3:
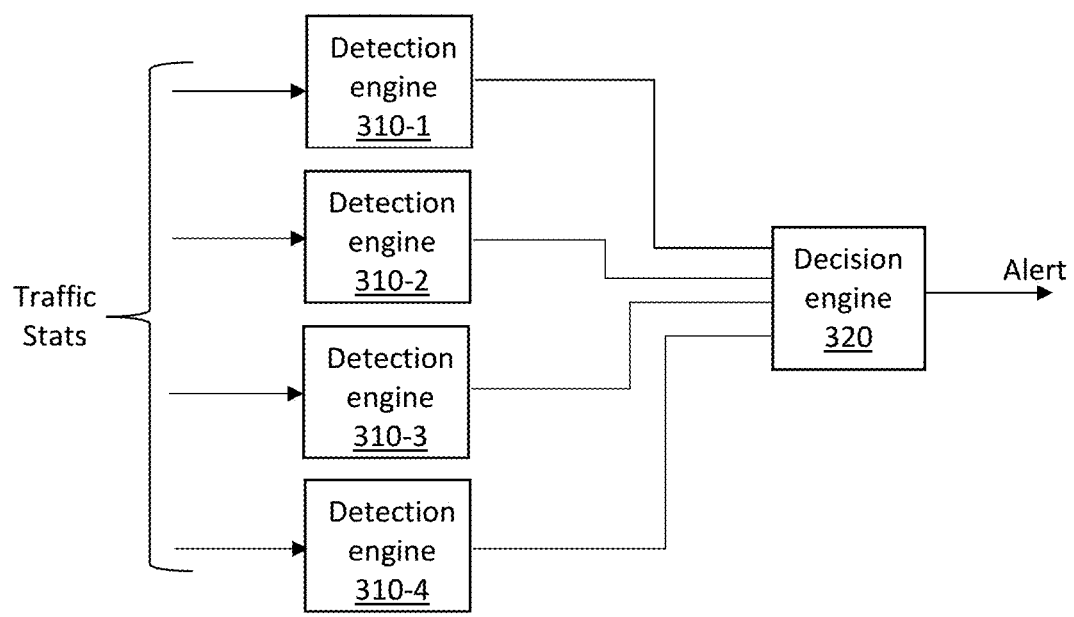
FIG. 3 is a block diagram illustrating various detection engines utilized according to an embodiment.

The operation of the DNS protection system 210 in a detection mode is further described with respect to FIG. 3. In the example embodiment shown in FIG. 3, four detection engines 310-1 through 310-4 are utilized by the DNS protection system 210. Each detection engine 310 implements a different detection function. The outputs of the detection engines 310-1 through 310-4 are sent to a decision engine 320. The decision engine 320 is configured to determine if an attack occurs (on-going) based on the outputs of the detection engines 310-1 through 320-4. The decision engine 320 may be realized as logic circuity.

In an embodiment, the detection engine 310-1 is configured to detect anomalies in a ratio between incoming requests to the DNS resolver 210 and responses generated by the name servers 250. In a further embodiment, the anomalies may be detected based further on frequency of the requests, the responses, or both. Such an anomaly would typically follow an increase in the incoming requests. That is, during peace time, a normal rate of requests (DNS queries) are observed. Therefore, a rate of requests above the normal peace time rate may indicate an attack. Further, the number of responses generated by the name servers 250 for incoming requests would be low, as most requests can be served from the cache 225 of the DNS resolver 220.

The detection engine 310-1 can be tuned or set to the normal request rate and request-to-response ratio during a predefined learning period. That is, during that period, the rate of incoming requests and generated responses are learned. The ratio is computed based on the learned rates.

In order to detect a potential recursive DNS attack, the detection engine 310-1 attempts to identify an increase in the rate of incoming DNS requests to the DNS resolver 220 and to determine if the request-to-response ratio computed at peace time is higher than a current ratio. This is a ratio between the requests from the clients 230 and the responses from name servers 250. That is, a decision indicating a potential attack will be detected by the detection engine 310-1 when:

$$\text{Request-Rate (Peace Time)} < \text{Request-Rate }(Ti)$$

And $$\frac{\text{Response Rate}}{\text{Request Rate}}(\text{Peace Time}) < \frac{\text{Response Rate}}{\text{Request Rate}}(Ti)$$

Where, Ti is a current detection time, and peace time is the value determined during a learning period. It should be noted that the detection engine 310-1 may consider any type of responses generated by the name servers 250, the DNS resolver 220, or a combination thereof. It should be noted that the above equations are rate-based, and the detection of attacks is based on comparing incoming responses from the name servers with incoming requests from the customers. It should be noted that typically the response rate from the servers is very low (close to zero) and the request rate is high.

In another embodiment, the detection engine 310-2 is configured to detect anomalies in a ratio between incoming NXDOMAIN responses from other responses generated by the name servers 250. Such an anomaly would typically follow an increase in the rate of NXDOMAIN responses. A NXDOMAIN response is a response generated by a name server that includes the error code "NXDOMAIN" (non-existent Internet domain name). Such an error code is added to the response when one of the name servers 250 cannot resolve a domain name request.

During peace time, a normal rate (e.g., messages per second) of NXDOMAIN responses is monitored. Specifically, the number of NXDOMAIN responses generated by the name servers 250 for incoming requests would be low, as most requests would be for legitimate requests. The detection engine 310-2 can be tuned or set to a normal rate and ratio observed during a predefined learning period. That is, during that period, the rate of NXDOMAIN responses and other types responses issued by the name servers 250 are learned. The ratio is computed based on the learned rates.

To detect a potential recursive DNS attack, the detection engine 310-2 attempts to identify an increase in the rate of incoming NXDOMAIN responses issued by the name servers 250 and returned to the DNS resolver 210, and determines if the ratio computed at peace time is higher than a current measured ratio. Specifically, responses from the name servers to the recursive server are monitored. The rate invariant is the portion of NXDOMAIN among all other responses types has increased. Typically, in peace time there is a low number of responses, and in particular a low number of NXDOMAIN responses. Therefore, this rate invariant is expected to be relatively low. During an attack, a higher number of responses and more NXDOMAIN responses are expected. In an embodiment, a decision indicating a potential attack will be detected by the detection engine 310-2 when:

$$\text{NXDOMAIN\_Response Rate (Peace Time)} < \text{NXDOMAIN\_Response Rate }(Ti)$$

And $$\frac{\text{NXDOMAIN\_Response Rate}}{\text{Response Rate}}(\text{Peace Time}) < \frac{\text{NXDOMAIN\_Response Rate}}{\text{Response Rate}}(Ti)$$

Where, Ti is a current detection time, and peace time is the value determined during a learning period. It should be noted that the detection engine 310-2 considers any type of response generated by the name servers 250, the DNS resolver 210, or both.

In another embodiment, the detection engine 310-3 is configured to detect potential DNS recursive attacks based on lengths of DNS queries received by the DNS resolver 210. The length of a DNS query is based on the length of the name of the domain name be resolved. For example, a query to resolve "cnn.com" is shorter than a query to resolve "fakewebsite8212.com".

At peace time, i.e., during a learning period, the distribution of DNS query lengths is determined. That is, the number of DNS queries having the same length is determined. For example, a number of DNS queries having a length of 10 characters and a number of DNS queries having a length of 15 characters are separately counted. Then, a probability for a DNS query having a specific length is computed. The probability (P(i)) is computed for each query's length (i). For example, the probability P(10) is computed as the ratio between the number of DNS queries having a length of 10 characters and the total number of counted queries. It should be noted that a DNS query may include a request sent by a client device to the DNS resolver 220. The learning may be performed by the DNS protection system 210.

The detection engine 310-3 is configured with the probabilities (P(i)) computed during a learning period. Therefore, the detection engine 310-3 is configured to detect any deviation from P(i) for each 'i' (query length). To this end, the detection engine 310-3 is configured to determine a probability P'(i) for DNS queries having a length 'i' and received after the learning period. The P'(i) is determined for each occurrence of a query length i.

During a recursive DNS attack, the attacker generates requests with random prefixes (subdomains) for a target domain name. Such prefixes (subdomains) may have variable lengths, and thus the distribution of DNS query lengths is expected to be different from the distribution observed during peace time. Therefore, deviations from the computed P(i) will indicate an anomaly in the lengths of received DNS queries. It should be noted that a DNS query may include a request sent by a client device to the DNS resolver 220.

In yet another embodiment, the detection engine 310-4 is configured to detect potential DNS recursive attacks based on distributions of common domain names. At peace time, i.e., during a learning period, the distribution of common domain names is determined based on requests previously resolved by DNS resolver 220. In an embodiment, the learnt information can be based on the DNS resolver's contents and/or information collected independently, for example, by the system 210.

The learning can be adaptive, as new FQDNs are resolved and added to the cache. In addition, a number of occurrences of each cached domain name is also determined. A FQDN is composed of subdomain (e.g. "www") and domain ("google.com"), both of which are separately counted.

The learned fully qualified domain names are saved in the detection engine 310-1. Thereafter, the detection engine 310-4 is configured to monitor deviations from the learned fully qualified domain name. During a DNS recursive attack, the attacker generates requests with random subdomains and, thus, the FQDN distribution is expected to be significantly different than the distribution observed during peace time. This is due to the fact that during an attack, the rate of requests for random generated subdomain is significantly increased. As such, the number of requests matching the learned list of FQDNs observed during peace time would be significantly low. The random subdomains are expected to have one occurrence compared to legitimate FQDNs that are expected to recur and stored in the cache.

The decision engine 320 is configured to generate a detection decision based on the outputs generated by one or more of the detection engines 310-1 through 310-4, and to generate an alert based on those outputs. For example, the decision engine 320 may generate an alert when any combination of two detection engines report a potential attack.

It should be noted that the number of detection engines 310 is not limited to four, and that detection engines can be added or removed based on the number of detection functions implemented by the system 210. Additionally, different detection engines may be equally utilized without departing from the scope of the disclosure.

In an embodiment, any of the detection engines 310-1 through 310-4 and the decision engine 320 can be implemented in hardware, software, or a combination thereof. The hardware may include any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The software is stored in a machine-readable media and shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions are executed by a processing circuitry or otherwise by hardware.

In an embodiment, each of the detection engines 310-1 through 310-4 is realized using fuzzy logic programmed to detect anomalous DNS request/response patterns. The fuzzy logic implements adaptive algorithms, thereby allowing the detection engine 310 to be continually tuned to fit characteristics of the DNS resolver 220. Such an adaptive algorithm may include, for example, Infinite Impulse Response (IIR) filters, which continually average traffic parameters (e.g., rates of DNS requests, responses, or both) and shape fuzzy logic membership functions accordingly. The use of fuzziness for representing the quantitative features monitored for detection of DNS recursive attacks generally eliminates the abrupt separation of abnormality from normality, providing a measure of the degree of abnormality or normality of a given feature.

Figure 4:
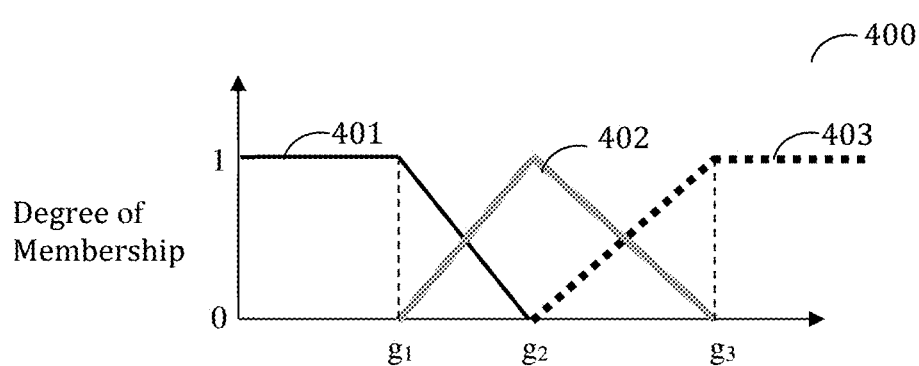
FIG. 4 is a graph demonstrating membership functions that can be implemented by a fuzzy logic.

For example, FIG. 4 shows a data plot 400 illustrating three example adapted membership functions of fuzzy logic implemented by one of the detection engines 310. A non-attack membership function 401, a potential attack membership function 402, and an attack membership function 403, respectively, define how each point in the input parameter space is mapped to a degree of membership between 0 and 1. For example, implementing the membership functions in the detection engine 310-1, the input parameter may be the ratio between incoming DNS requests and responses.

Returning to FIG. 2, upon detection of a DNS recursive attack, the DNS protection system 210 can perform one or more mitigation actions. In an embodiment, the mitigation action may include identifying a domain name under attack and creating a footprint based on the target domain name under attack. For example, for a FQDN "www.mysite.com", the footprint based on the domain name is "*.mysite.com". A footprint is generated in real-time as requests are received. Any request matching the footprint is compared against a white list of legitimate FQDNs. If the requested domain name to be resolved is designated in the white list, then the request is allowed. Otherwise, the request is blocked.

In an embodiment, the white list includes a list of FQDNs. For example, the domain may be google.com with its subdomains mail.google.com, photos.google.com, and so on. The white list can be learned by the DNS protection system 210 during the learning phase. The white list can also be defined manually based on the contents of a cache of the DNS resolver 220.

Following are a few examples for the operation of the mitigation action. In this example, the target domain under attack is "mysite.com" and its footprint is "*.mysite.com". The example white list being utilized includes the following FQDNs:

mysite.com
    app1.mysite.com
    app2.mysite.com
    team.mysite.com

As an example, a DNS request received during an attack designates the domain name "app1.mysite.com", the request matches the footprint (*.mysite.com") and the requested domain to be resolved is included in the exemplary white list, thus the request is allowed. As another example, a DNS request received during an attack designates the domain name "random.mysite.com". The request matches the footprint "mysite.com", but the requested subdomain "random" is not included in the exemplary white list. Therefore, the request is blocked. As another example, a DNS request received during an attack designates the domain name "www.oursite.com". The request does not match the footprint "mysite.com", and thus the request is allowed. This is true for any FQDN that does not match the footprint. The mitigation is only applied on the target domain that is under attack without impact on other legitimate queries.

It should be noted that the white list based filtering provides an improved solution over a black list filtering, as a black list includes a limited list of malicious (randomly generated) domain names. As noted above, during a recursive DNS attack, many different domain names are randomly generated and, thus, a black list often cannot be structured to encapsulate such domains. In contrast, a white list includes about 90% of the resolved legitimate domain names, and any random generated domain name will be blocked as such a domain name is not designated in the list.

It should be appreciated that the embodiments disclosed herein are not limited to the specific architecture illustrated in FIG. 2, and that other architectures may be used without departing from the scope of the disclosed embodiments. Specifically, in an embodiment, there may be a plurality of DNS protection systems 210 operating as described hereinabove and configured to either have one as a standby, to share loads between them, or to split the functions between them. Furthermore, in a typical deployment, there may be a plurality of DNS resolvers 220—a single DNS resolver 220 is shown FIG. 2 merely for purposes of simplicity of the discussion. A DNS protection system 210 can defend a single DNS resolver or a cluster of resolvers.

Figure 5:
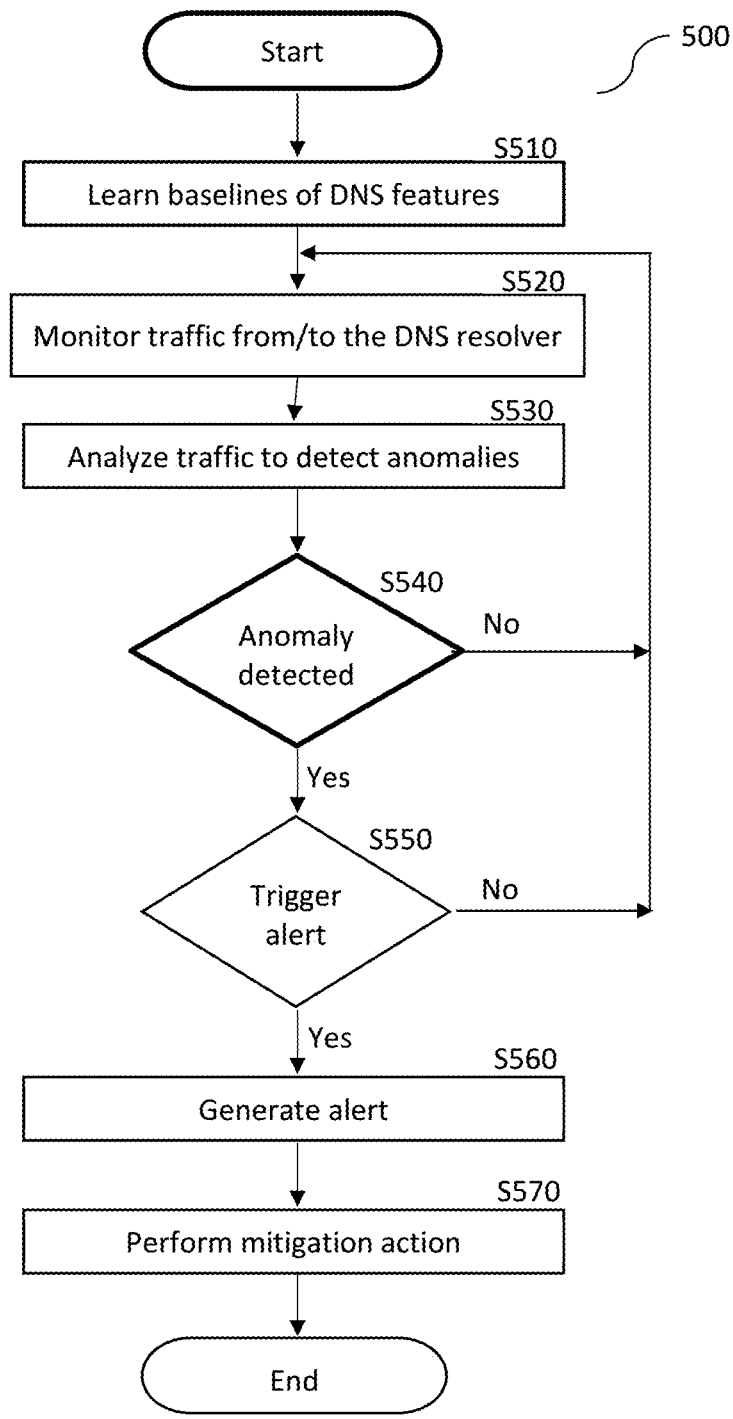
FIG. 5 is a flowchart illustrating a method for detecting and mitigating recursive DNS attacks according to an embodiment.

FIG. 5 shows an example flowchart 500 illustrating a method for detecting DNS recursive attacks according to an embodiment. At S510, a plurality of detection baselines related to rate and rate invariants of DNS features are learned. The learning is performed over a predefined period or periods of time. That is, a different learning period may be set for each different rate or rate invariant. As described further herein above, the learned baselines may be baselines of a rate of incoming queries (requests to a DNS resolver), a ratio between incoming requests and returned responses (from name servers), a rate of NXDOMAIN responses to the DNS resolver, a ratio between NXDOMAIN responses and other types of responses, distributions of DNS queries having various lengths, and distributions of common domain names. The baselines can be learned and set based on statistics gathered with respect to DNS requests received by a DNS resolver, recursive DNS requests sent by the DNS resolver, responses received or generated by the DNS resolver, contents of the DNS resolver's cache, resolved domain names, or a combination thereof. The statistics may be collected, e.g., by a security system (e.g., the DNS protection system 210) or received from an external source. In an example embodiment, one, some, or all of the baselines may be configured or preconfigured, for example, by a user.

In an embodiment, detection functions are set based on the baselines. The detection functions may include, but are not limited to, fuzzy logic functions.

In certain embodiments, S510 may further include generating a white list of FQDMs. To this end, any domain name cached in the DNS resolver is analyzed and added to the white list. In addition, any requests resolved by the DNS resolver are monitored, analyzed and added to the white list. The analysis may include checking the validity of the domain name, checking an "age" of a cache entry, and so on. Techniques for generating such white lists are discussed in more detail above.

At S520, at least traffic directed to and from a DNS resolver (e.g., the DNS resolver 220) is monitored. The monitored traffic includes at least resolver queries (i.e., requests received at the DNS resolver); query responses (generated by the DNS resolver); requests sent by the DNS resolver; and responses generated by name servers and directed to the DNS resolver. In an embodiment, the monitoring includes parsing the various requests and responses. As an example, the requests can be parsed to extract the domain names (e.g., full or sub domain names designated therein). Responses can be parsed to extract the type of the responses (e.g., NXDOMAIN) or fully resolved domain names.

At S530, the monitored traffic is analyzed using one or more detection functions to detect anomalies from the learned baselines (i.e., of the rates and rate invariants). The detection functions can be implemented as the detection engines discussed above. For example, an anomaly may be detected when:

NXDOMAIN_Response Rate (Peace Time) <

$$\text{NXDOMAIN\_Response Rate } (Ti)$$

And $$\frac{\text{NXDOMAIN\_Response Rate}}{\text{Response Rate}}(\text{Peace Time}) <$$

$$\frac{\text{NXDOMAIN\_Response Rate}}{\text{Response Rate}}(Ti)$$

The peace time represents the learned baselines and Ti represents the currently monitored traffic.

At S540, it is checked if at least one anomaly has been detected. If so, execution continues with S550; otherwise, execution returns to S520. At S550, it is checked if an alert on a potential DNS recursive attack should be triggered. If so, execution continues with S560; otherwise, execution returns to S520.

It may be determined that an alert should be triggered when one, some, or all of the detection functions detect anomalies. In an embodiment, the number of detection functions that would trigger an alert is configured based on a required level of protection, a sensitivity (tolerance to false positives), a likelihood to be exposed to attack (e.g., based on information of an on-going attack campaign), a combination thereof, and so on.

At S560, an alert is generated indicating the potential DNS recursive attack. In an embodiment, a footprint of the domain name under attack is generated. The footprint is used during a mitigation phase. The footprint, in an embodiment, contains the root domain of the domain name targeted by the attacker. Some examples for a footprint are provided above.

At S570, at least one mitigation action is performed. The mitigation action may include, but is not limited to, filtering out any incoming DNS queries (requests) having domain names that are not designated in a white list.

Figure 6:
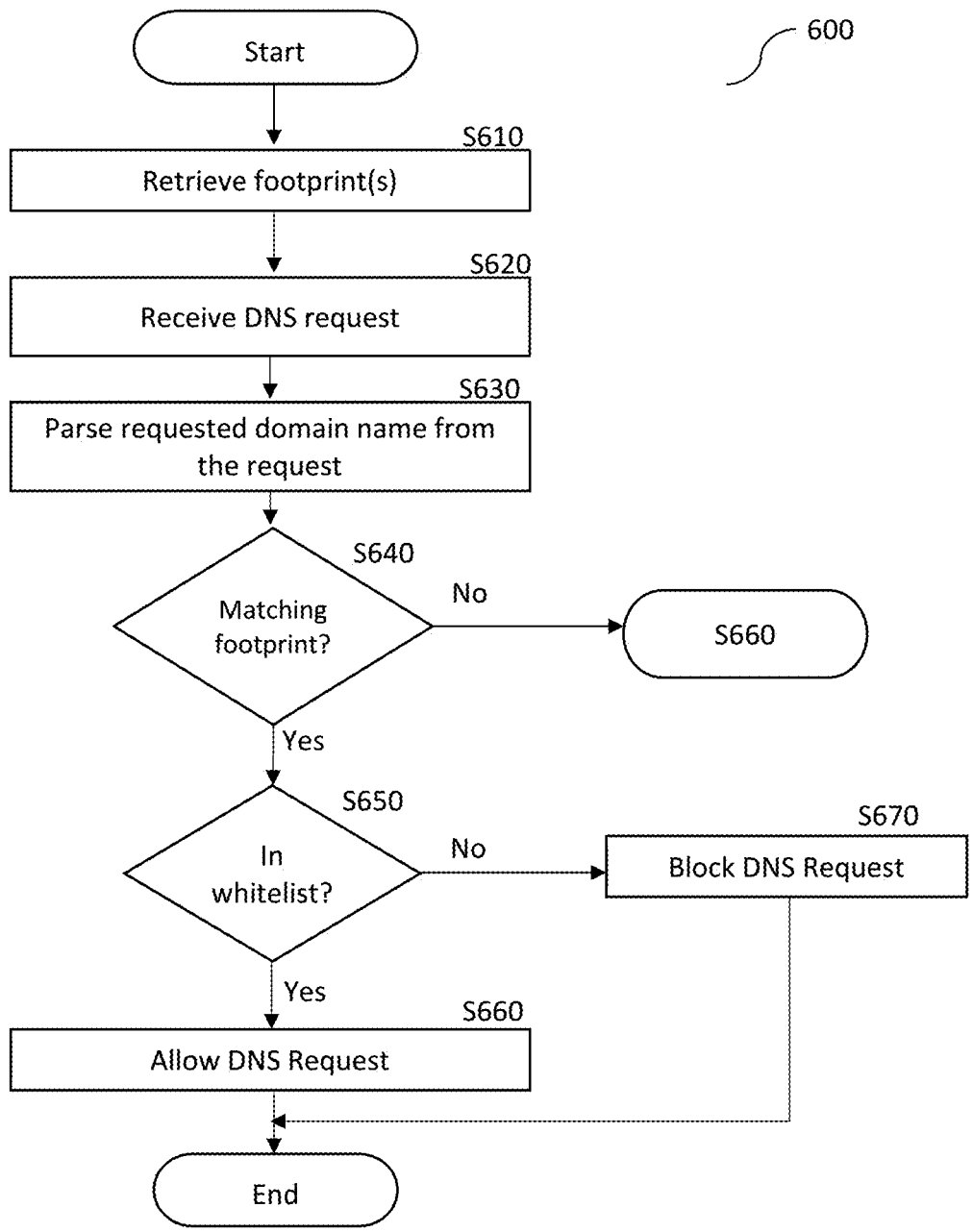
FIG. 6 is an example flowchart illustrating a method for mitigating DNS recursive attacks according to an embodiment.

FIG. 6 shows an example flowchart S560 illustrating a method for mitigating DNS recursive attacks according to an embodiment. The method is performed in a response to detection of a DNS attack.

At S610, a footprint of each domain name under attack is retrieved. At S620, a DNS request directed to the DNS resolver is received. The DNS request is sent by a client device.

At S630, the received DNS request is parsed to at least identify the domain requested to be resolved. At S640, the requested domain name is compared against the footprints.

If a match is found, execution continues with S650; otherwise, at S660, the received request is allowed and sent to the resolver.

At S650, it is checked if the requested domain name is designated in the white list, and if so, execution continues with S660; otherwise, at execution continues with S670, where the received DNS request in blocked. As noted above, the white list includes a list of legitimate FQDMs. In some embodiments, the requested domain names from blocked DNS requests are added to a black list. It should be noted that the mitigation action is performed on any DNS request received during an attack.

Figure 7:
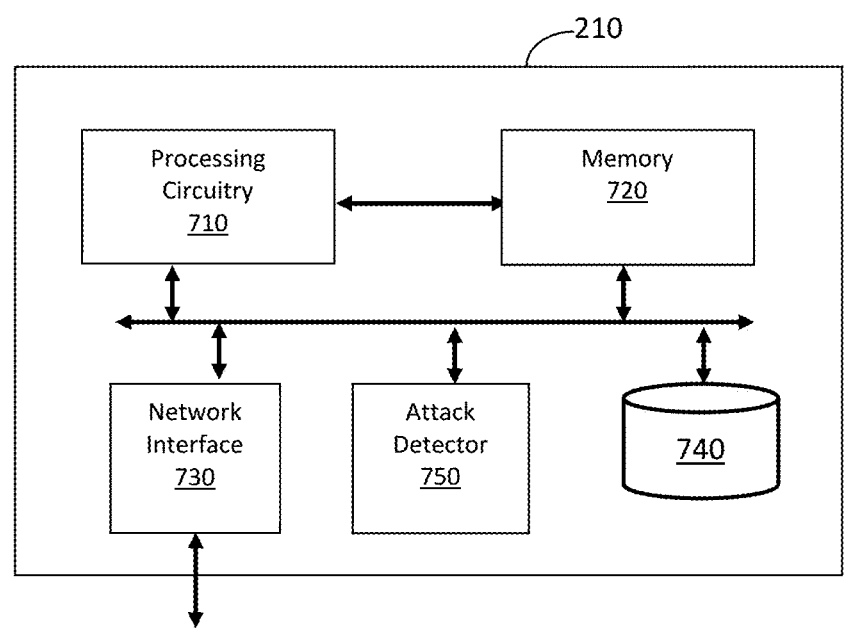
FIG. 7 is a block diagram of a DNS protection system according to an embodiment.

FIG. 7 shows an example block diagram of the DNS protection system 210 according to an embodiment. The DNS protection system 210 is configured to detect recursive DNS attacks. The DNS protection system 210 includes a processing circuity 710 coupled to a memory 720, a network interface 730, a storage 740, and an attack detector 750.

The network interface 730 is configured to allow the communication with client devices, DNS resolvers, name servers, any external systems, or a combination thereof. The processing circuity 710 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuity 710 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions.

The memory 720 may comprise volatile memory components, non-volatile memory components, or both, including but not limited to static random access memory (SRAM), dynamic random access memory (SRAM), Flash memory, magnetic memory and other tangible media on which data, instructions, or both may be stored. The memory 720 may contain instructions that, when executed by the processing circuitry 710, performs, for example and without limitations, the processes for detecting recursive DNS attacks as described in more detail in above. The memory 720 may also include a white list of domain names.

The storage 740 may be configured to store learned baselines, request and response rates, ratios, distributions of domain names having different lengths, distributions of common domain names, analysis results, or a combination thereof. The storage 740 may be realized as a magnetic storage, optical storage, and the like, and may be realized, for example, as flash memory or other memory technology, CD-ROM, in-memory DB technologies, Digital Versatile Disks (DVDs), or any other medium which can be used to store the desired information.

The attack detector 750 is configured to perform a process for detection and mitigation of recursive DNS attacks as described in greater detail herein above with reference to FIGS. 3-6. The attack detector 750 can be realized by any discrete hardware components, dedicated hardware finite state machines, or any other suitable entities that can perform calculations or other manipulations of information. In an embodiment, the attack detector 750 may implement the detection and decision engines discussed with respect to FIG. 3.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method, comprising:
    learning a plurality of baselines of at least rates and rate invariants of domain name system (DNS) features;
    monitoring DNS traffic directed to and from a DNS resolver, wherein the DNS resolver is communicatively connected between at least one client and at least one name server;
    analyzing the monitored DNS traffic using at least one detection function to detect in the monitored DNS traffic at least one anomaly based on at least one baseline of the plurality of learnt baselines, each of the at least one anomaly indicating a potential attack upon a domain name;

determining, based on the detected at least one anomaly, that a recursive DNS attack upon the domain name is in progress; and upon detection that the recursive DNS attack upon the domain name is in progress, performing at least one mitigation action to filter out incoming DNS queries to the domain name is under attack, wherein performing the mitigation action determines which domain name is the domain name under attack;

wherein the least one detection function is a fuzzy logic function set based on the at least one baseline of the plurality of learnt baselines.

2. A method, comprising:

learning a plurality of baselines of at least rates and rate invariants of domain name system (DNS) features;

monitoring DNS traffic directed to and from a DNS resolver, wherein the DNS resolver is communicatively connected between at least one client and at least one name server;

analyzing the monitored DNS traffic using at least one detection function to detect in the monitored DNS traffic at least one anomaly based on at least one baseline of the plurality of learnt baselines, each of the at least one anomaly indicating a potential attack upon a domain name;

determining, based on the detected at least one anomaly, that a recursive DNS attack upon the domain name is in progress; and upon detection that the recursive DNS attack upon the domain name is in progress, performing at least one mitigation action to filter out incoming DNS queries to the domain name is under attack, wherein performing the mitigation action determines which domain name is the domain name under attack;

wherein the at least one detection function employs fuzzy logic to perform anomaly detection.

3. A system, comprising:

a processing circuitry; and a memory, the memory containing instructions that, when executed by the processing circuitry, configure the system to:

learn a plurality of baselines of at least rates and rate invariants of domain name system (DNS) features;

monitor DNS traffic directed to and from a DNS resolver, wherein the DNS resolver is communicatively connected between at least one client and at least one name server;

analyze the monitored DNS traffic using at least one detection function to detect in the monitored DNS traffic at least one anomaly based on at least one baseline of the plurality of learnt baselines, each of the at least one anomaly indicating a potential attack upon a domain name; and determine, based on the detected at least one anomaly, that a recursive DNS attack upon the domain name is in progress; and up detection that the recursive DNS attack upon the domain name is in progress, perform at least one mitigation action to filter out incoming DNS queries to the domain name is under attack, wherein performing the mitigation action determines which domain name is the domain name under attack;

wherein the least one detection function is a fuzzy logic function set based on the at least one baseline of the plurality of learnt baselines.

4. The method of claim 1, wherein the method is performed at a DNS protection system located between the at least one client and the DNS resolver.

5. The method of claim 1, wherein the DNS resolver is a recursive DNS resolver and where the at least one name server is an authoritative DNS name server for at least one of a domain and a subdomain.

6. The method of claim 1, wherein a baseline of the plurality of baselines includes any one of: a rate of incoming DNS queries, a ratio between incoming DNS queries and returned responses from name servers, a rate of NXDOMAIN responses sent by the DNS resolver, a ratio between NXDOMAIN responses and other types of responses, distributions of incoming DNS queries having various lengths, and distributions of common domain names.

7. The method of claim 6, wherein each baseline of the plurality of baselines is learnt over a predefined period of time based on statistics gathered with respect to at least one of: DNS requests received by a DNS resolver, recursive DNS requests sent by the DNS resolver, responses received or generated by the DNS resolver, contents of the DNS resolver's cache, and resolved domain names.

8. The method of claim 1, wherein analyzing the monitored DNS traffic using at least one detection function further comprises:

determining a rate anomaly when a learnt query-to-response ratio baseline is higher than a current measured query-to-response ratio.

9. The method of claim 1, wherein analyzing the monitored DNS traffic using at least one detection function further comprises:

determining an NXDOMAIN response anomaly when a ratio between incoming NXDOMAIN responses and other responses generated by the at least one name server deviates from a respective learnt baseline of the plurality of baselines.

10. The method of claim 1, wherein one of the plurality of baselines is a baseline of distribution of lengths of DNS queries received by the DNS resolver and wherein analyzing the monitored DNS traffic using at least one detection function further comprises:

determining existence of a DNS query length anomaly when a distribution of lengths of DNS queries received by the DNS resolver deviates from the baseline of distribution of lengths of DNS queries received by the DNS resolver.

11. The method of claim 1, wherein one of the plurality of baselines is a baseline of lengths of common domain names to be resolved wherein analyzing the monitored DNS traffic using at least one detection function further comprises:

determining a DNS query length anomaly when a distribution of lengths of common domain names to be resolved deviates from the distribution of lengths of common domain names to be resolved baseline.

12. The method of claim 1, wherein analyzing the monitored DNS traffic using at least one detection function further comprises:

determining a fully qualified domain name (FQDN) anomaly when a distribution of resolved FQDNs deviates from a respective learnt baseline of the plurality of baselines.

13. The method of claim 1, further comprising:
sending the incoming DNS query to the DNS resolver when an identified domain name does not match any generated footprint.

14. The method of claim 1, further comprising:
adding the determined domain name to a black list, when the determined domain name is not designated in a white list.

15. The method of claim 1, wherein a white list includes a list of legitimate fully qualified domain names.

16. The method of claim 1, wherein the detected and mitigated cyber-attack is at least a DNS-based distributed denial-of-service (DDoS) attack.

* * * * *